UNITED STATES PATENT OFFICE.

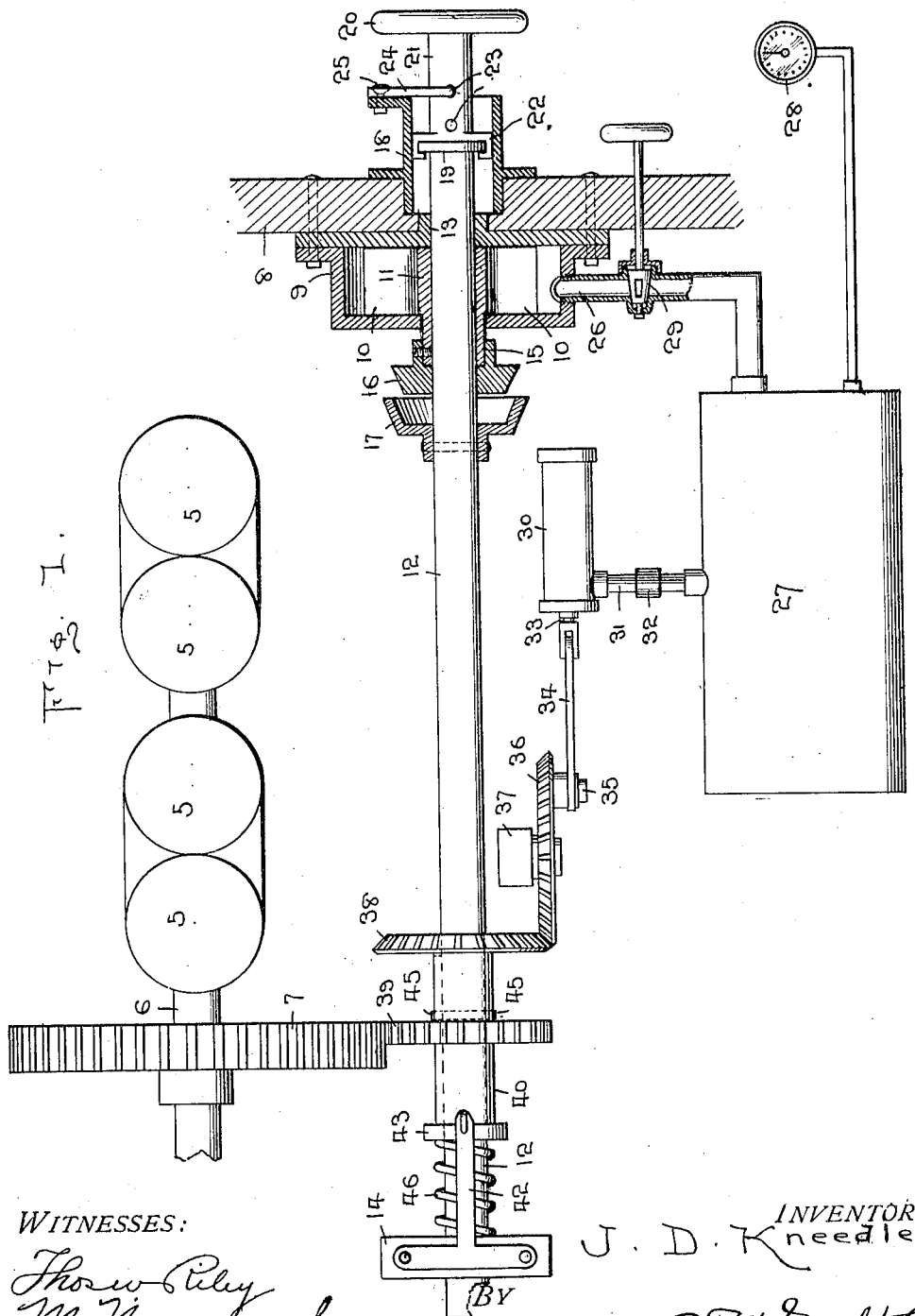

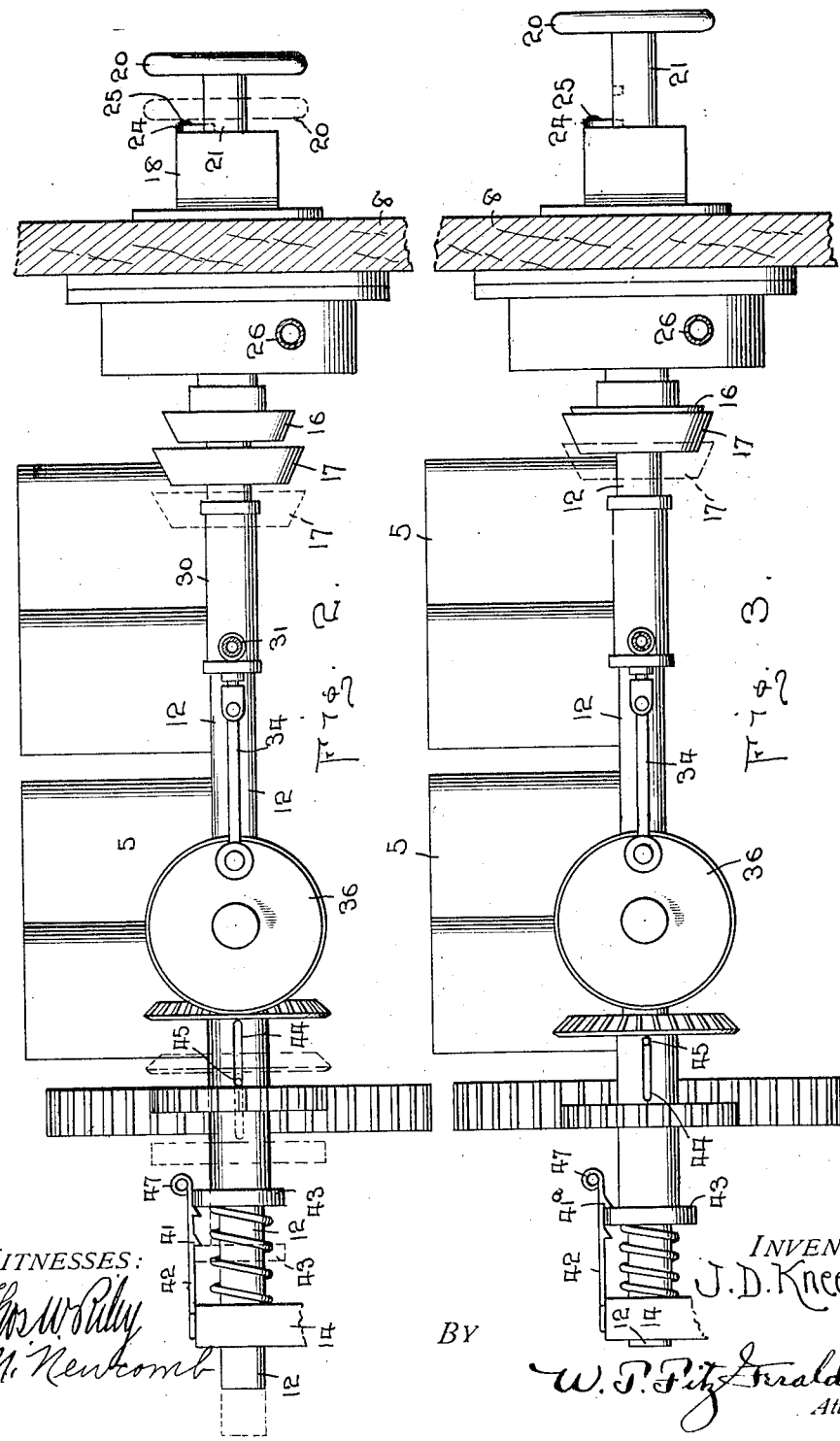

JOHN D. KNEEDLER, OF SIOUX CITY, IOWA, ASSIGNOR OF ONE-HALF TO BUEL COUCH, OF SIOUX CITY, IOWA.

STARTING DEVICE.

1,112,627.  Specification of Letters Patent.  Patented Oct. 6, 1914.

Application filed April 20, 1912.  Serial No. 692,085.

*To all whom it may concern:*

Be it known that I, JOHN D. KNEEDLER, a citizen of the United States, residing at Sioux City, in the county of Woodbury and State of Iowa, have invented certain new and useful Improvements in Starting Devices; and I do hereby declare the following to be a full, clear, and exact description of the invention, such as will enable others skilled in the art to which it appertains to make and use the same.

This invention relates to power transmission gearing, and it more particularly relates to a shiftable gear mechanism adapted to be used in connection with an engine, motor or other source of motive power; and still more particularly to be used in connection with an automobile or the like.

An object of the invention is to provide a device of this character which is adapted to be thrown in and out of mesh optionally and alternately, with the main driving gear of an engine or the like, and adapted to transmit the power thereof to an air pump, whereby compresssed air may be stored in a tank for operating an air motor and thereby starting the engine and for auxiliating the power thereof, when needed.

A further object of the invention is to provide, in a device of this character, means for interrupting communication between the engine and the pump, while the air motor remains in communication, or in coöperative relation, with the engine.

With these objects in view, the invention consists in the improved construction, arrangement and combination of parts of a device of the character specified, which will be hereinafter fully described and afterward specifically claimed.

In the accompanying drawings which form a part of this application, Figure 1 shows, somewhat diagrammatically, a group of engine cylinders, an air pump, and an air tank, having my improved power transmission gearing applied in connection therewith, certain parts of the latter being in section. Fig. 2 is an elevation view of the power transmission device, in connection with the engine cylinders and the air pump illustrated in Fig. 1, and, Fig. 3 is a view similar to Fig. 2, several of the shiftable elements thereof being shown in shifted relation.

In these drawings, in which similar reference characters designate corresponding parts throughout the several views, the engine cylinders of an automobile are designated 5, the crank shaft or engine shaft being represented by the numeral 6 and carrying a main driver or toothed gear wheel 7. The dash board of an automobile is represented by the numeral 8, and to this dash board is secured an air motor housing 9, within which the blades 10 of the air motor, secured to a hub 11 of the air motor are adapted to rotate; said hub being loosely seated upon a shaft or spindle 12, a bearing of which is formed at 13, in the motor casing; the other bearing 14 being adapted for connection with the automobile in any proper way. The hub 11 has an extension 15, to which is secured a friction cone 16. The spindle 12 has a friction cup or friction clutch member 17 secured thereto, and adapted to be thrown into and out of coöperative relation with the friction cone 16, said cone and cup constituting a friction clutch.

Secured to the outside of the dash board, by any proper means, is a guide chamber 18, preferably of rectangular contour and having a rectangular aperture extending therethrough, said guide chamber inclosing the outer end of the spindle 12, which is provided with a flanged end 19. The spindle 12 is adapted to be shifted in the direction of its axis, and for the purpose of shifting said shaft, I have provided a hand-wheel or handle 20 having a shank 21 secured thereto, the inner end of said shank being provided with flange-engaging claws, hooks or flanges 22, which loosely engage the flange 19 of the spindle 12; so that the spindle may rotate within the flange-engaging end of the shank and, that, by moving the shank longitudinally, the spindle may be moved longitudinally thereby. The shank 21 is provided with radial apertures 23, adapted for engagement with a keeper 24, said keeper being pivoted at 25 to the guide chamber 18 and having a down-turned end adapted to alternately enter the apertures 23. Referring to Fig. 1, it will be seen that if the keeper 24 is released from the right-hand or outer aperture 23, and the spindle and shank be shifted to the position shown in Fig. 3, so that the keeper 24 engages the left-hand or inner aperture 23, the cupped clutch member 17 will be brought into contact with the cone clutch member 16, thereby coupling the spindle 12 into coöperative relation with the air motor.

The air motor is adapted to be actuated by a current of compressed air from the compressed-air pipe 26, said pipe communicating with the compressed-air tank 27, the latter being provided with the usual pressure gage 28, a valve 29 being provided in the pipe 26 for establishing and interrupting communication between the air tank and the air motor. An air pump 30, communicates with the air tank 27 through the medium of a supply pipe 31, the latter being provided with a check-valve 32, for preventing back pressure of air from the tank to the pump. The pump 30 may be of ordinary construction, being provided with a piston rod 33 and connecting rod 34; the latter being pivotally connected at 35 to a gear wheel 36, adapted to be appropriately and conveniently mounted through the medium of a bearing 37.

A longitudinally shiftable gear member, comprising gear wheels 38 and 39 and a hollow cylindrical element 40, is rotatably mounted upon the spindle 12 and adapted to be moved longitudinally thereof, and also to be moved therewith by means of the stud 45 and thereby adapted to be thrown alternately and optionally into and out of mesh with the main driver 7 and the gear wheel 36, while also being adapted to be thrown out of mesh with the gear wheel 36 without being out of mesh with the main driver; and these several alternative relations are important for the following reasons, viz: Let it be assumed that this device is applied to an automobile, and that the automobile is traveling over a hilly road;—when the automobile is traveling down hill, the engines will be thrown out of operation by the operator the gear 38 is thrown into mesh with the gear 36 by shifting the spindle 12 longitudinally (as explained in the foregoing); whereupon, instead of applying the brake, the operator throws the gear wheel 39 into mesh with the gear wheel 7, and the latter being rotated by the travel of the automobile, actuates the gear wheels 39, 38 and 36, and thereby actuates the pump 30, thereby storing and compressing air in the tank 27, by which said compressed air is held in reserve. It will be seen that the resistance or back pressure of the air, being compressed by the pump, retards the action of the gear wheels 36, 38 and 39, thereby retarding the action of the main driver, hence operating as a brake, for retarding the motion of the automobile. It is therefore obvious, that the energy, which would otherwise be lost, is conserved and stored within the compressed air tank 27. Now, let it be assumed that the automobile has started up a steep hill, and therefore, the engine is incapable of propelling the automobile at full speed; it will be seen that by throwing the gears 36 and 38 out of mesh, and opening the valve 29, the air from the pipe 26 will act upon the paddles or blades 10, causing the hub 11 and cone 16 to rotate with the spindle 12. It will be seen, that the gear wheels 7 and 39 still being in mesh, as in Fig. 3, the engine or engines will continue to actuate the spindle 12 after the pumping mechanism has been disconnected, and so, the engine and air motor operate in unison, or in other words, the air motor auxiliates the action of the engine, through the medium of the spindle 12 and the gear wheels 39 and 7.

When the automobile is traveling on a perfectly or practically level road, it may be desirable to discontinue or eliminate the use of the pump and air motor, and when such is the case, the spindle 12 and the elements fixed thereto may be moved into the dotted line position shown in Fig. 2. When moved into this dotted line position, the longitudinally shiftable gear member is moved therewith into its dotted line position, and retained therein by means of the tooth 41, of a spring catch or detent 42, secured to the bearing 14; said spring catch engaging the flange 43, of the shiftable gear member. This shiftable gear member is provided with a longitudinally and axially parallel slot 44, for the reception of a pin or stud 45, fixedly secured to the spindle. The spindle and slotted gear member are therefore held in fixed rotary relation while being in movable relation longitudinally or axially. It will be seen, therefore, that when it is desired to arrange the elements in the position shown in Fig. 3, the spindle 12 must first be moved leftward until the flange 43 is engaged by the tooth 41ª of the detent 42, the stud 45 contacting the left end wall of the aperture 44, the clutch member 17 being then in the dotted line position shown in Fig. 3, and while the flange 43 is engaged by the tooth 41ª, the spindle 12 is drawn rightward until the clutch members 16 and 17 are engaged.

When it is desired to throw the gear wheel 39 out of mesh with the gear wheel 7, the clutch member 17 is moved leftward into the dotted line position shown in Fig. 2, the flange 43 then being engaged by the tooth 41. It will be seen that, while the gear wheels 38 and 39 are out of mesh with the gears 36 and 7 respectively, the spindle 12 may be actuated independently of the engine or of the air pump, and therefore, it is quite possible to connect the spindle 12 with a machine tool (not shown) whereby the automobile may be repaired, or with a lifting jack or the like (not shown) whereby the machine may be raised, for convenience in repairing. It is also quite possible to connect air pipes other than the pipe 26 with the tank 27 for pumping up a pneumatic tire (not shown). The device may be employed as a starter for the engine, as follows:

Assuming that the automobile has been stopped, and that the engine has ceased to operate, being thrown out of gear with the automobile, and that a supply of compressed air has previously been pumped into the reservoir 27, as described, it is only necessary to move the clutch members 16 and 17 into engagement, while the gear wheels 7 and 39 are in mesh, and then open the valve 29, so that the air motor will impart motion to the main driver 7 through the medium of the spindle 12 and gear wheel 39. The engine having thus been started, the several elements of my improved transmission gear mechanism may be moved into whatever position is required by the attending circumstances, whereupon the engine may be thrown into mesh with the driving gear of the automobile, (not shown) in the usual manner.

When it is desired to release the collar 43 from the teeth of the detent 42, the free end of said detent may be raised out of engagement with said collar, whereupon the slidable gear member 40 may be moved toward the right, along the spindle 12, by any proper means; but, for this purpose I have provided a helical spring 46, around the spindle 12 and compressed between the bearing 14 and the flanged end 43 of the member 40. Any proper means (not shown) may be secured to the end portion 47 of the detent 42, for raising it out of engagement with the flange 43.

It is obviously quite possible and practical to provide a tank of sufficient strength and capacity for storing a large amount of air under such pressure that the automobile may be propelled thereby, independently of the engine, in case the latter becomes broken or otherwise disqualified for service; so that the device is not only applicable as a starting and auxiliating means, but is also applicable as an emergency motor, for propelling the automobile.

It will be seen that I have provided a device of this character which is fully capable of attaining the foregoing objects, and in a thoroughly practical and efficient manner.

I do not limit my invention to the exact details of construction, combination and arrangement of parts as illustrated and described in the foregoing, but my invention may only be limited by a reasonable interpretation of the claims.

I claim:

1. In a starting device a driver member, a fluid motor, a spindle having a flanged end and adapted to be reciprocated, a guide adjacent to said flanged end, and non-rotatable means associated with the guide and engaging the flanged end for reciprocating the spindle, said spindle having a clutch member secured thereto, said fluid motor having a clutch member secured thereto and adapted to be alternately engaged and disengaged by the first said clutch member when the spindle is reciprocated.

2. In a starting device a driver member, a pump, a fluid motor, a spindle adapted to be reciprocated, a slidable gear member reciprocable with said spindle and adapted to be alternately moved into and out of operative relation with said pump, means for retaining the slidable gear member in either of several optional and alternate positions while the spindle is being reciprocated relative thereto, and means for alternately throwing the spindle into and out of operative relation with the fluid motor while the slidable gear mechanism is in either of two alternative positions.

3. In a starting device, a driver member, a pump, a fluid motor, a spindle adapted to be reciprocated, a slidable gear member keyed on said spindle and having limited longitudinal movement relative thereto and adapted to be reciprocated with the spindle, said slidable gear member being also adapted to be moved into and out of operative relation with said pump, means for retaining the slidable gear member against longitudinal movement while the said spindle is in either of several optional and alternative positions and while the latter is being reciprocated, and means for alternately throwing the spindle into and out of operative relation with the fluid motor while the slidable gear mechanism is in either of two alternative positions.

4. In a starting device, a driver member, a fluid motor, a spindle, a slidable gear member keyed to said spindle and movable longitudinally relative to the latter, means for normally tending to move said gear member into operative position, means to lock said gear member in either of several optional and alternative positions while the spindle is being reciprocated relative thereto, and means for alternately throwing the spindle into and out of operative relation with the fluid motor while the slidable gear mechanism is in either of two alternative positions.

5. In a starting device, a driver member, a pump, a fluid motor, a spindle, a slidable gear member keyed to said spindle, movable longitudinally relative to the latter and adapted to be moved into and out of operative relation with said pump, means for normally tending to move said gear member into operative position, means to lock said gear member in either of several optional and alternate positions while the spindle is being reciprocated relative thereto, and means for alternately throwing the spindle into and out of operative relation with the fluid motor while the slidable gear mechanism is in either of two alternati[ve] positions.

In testimony whereof I have signed [my] name to this specification in the presence [of] two subscribing witnesses.

JOHN D. KNEEDLER.

Witnesses:
  Mrs. JOHN O. HAMMER
  CHAS. GRAHAM.